(12) United States Patent
Cromer et al.

(10) Patent No.: US 11,427,298 B2
(45) Date of Patent: Aug. 30, 2022

(54) ADVANCED PLUME SUPPRESSING SEGMENTED HEAT SHIELD

(71) Applicant: The Boeing Company, Chicago, IL (US)

(72) Inventors: William Cromer, Seattle, WA (US);
Matthew J. Woerly, Seattle, WA (US);
Robert E. Logan, Seattle, WA (US);
Genesis M. Pilarca, Seattle, WA (US)

(73) Assignee: THE BOEING COMPANY, Chicago, IL (US)

(*) Notice: Subject to any disclaimer, the term of this patent is extended or adjusted under 35 U.S.C. 154(b) by 275 days.

(21) Appl. No.: 16/574,996

(22) Filed: Sep. 18, 2019

(65) Prior Publication Data

US 2021/0078693 A1 Mar. 18, 2021

(51) Int. Cl.
*B64C 3/36* (2006.01)
*B64C 1/12* (2006.01)
*B64C 1/38* (2006.01)
*B64C 1/40* (2006.01)

(52) U.S. Cl.
CPC .............. *B64C 3/36* (2013.01); *B64C 1/12* (2013.01); *B64C 1/38* (2013.01); *B64C 1/40* (2013.01)

(58) Field of Classification Search
CPC .... B64C 3/36; B64C 1/12; B64C 1/38; B64C 1/40; B64C 7/02; B64D 33/04; B64D 27/26; B64D 29/02; B64D 2027/262
See application file for complete search history.

(56) References Cited

U.S. PATENT DOCUMENTS

| | | | |
|---|---|---|---|
| 7,927,686 B2 | 4/2011 | Zielinski et al. | |
| 7,943,227 B2 | 5/2011 | Connelly | |
| 9,783,285 B2 | 10/2017 | Connelly | |
| 10,260,540 B2 | 4/2019 | Connelly et al. | |
| 10,427,776 B2 | 10/2019 | Connelly et al. | |
| 2009/0098321 A1* | 4/2009 | Zielinski ............... | B64C 7/02 428/34.6 |
| 2017/0259906 A1 | 9/2017 | Connelly et al. | |
| 2018/0029688 A1 | 2/2018 | Connelly et al. | |
| 2018/0057140 A1 | 3/2018 | Connelly et al. | |

* cited by examiner

*Primary Examiner* — Timothy D Collins
*Assistant Examiner* — Justin Michael Heston
(74) *Attorney, Agent, or Firm* — Gates & Cooper LLP

(57) ABSTRACT

An aircraft structure including a heat shield. A heat shield including an interior; a skin enclosing the interior; a plurality of barriers attached in the interior to the skin, each of the barriers spaced to separate a plurality of thermal insulation layers disposed in the interior; and wherein the barriers suppress heat flow between the thermal insulation layers.

18 Claims, 11 Drawing Sheets

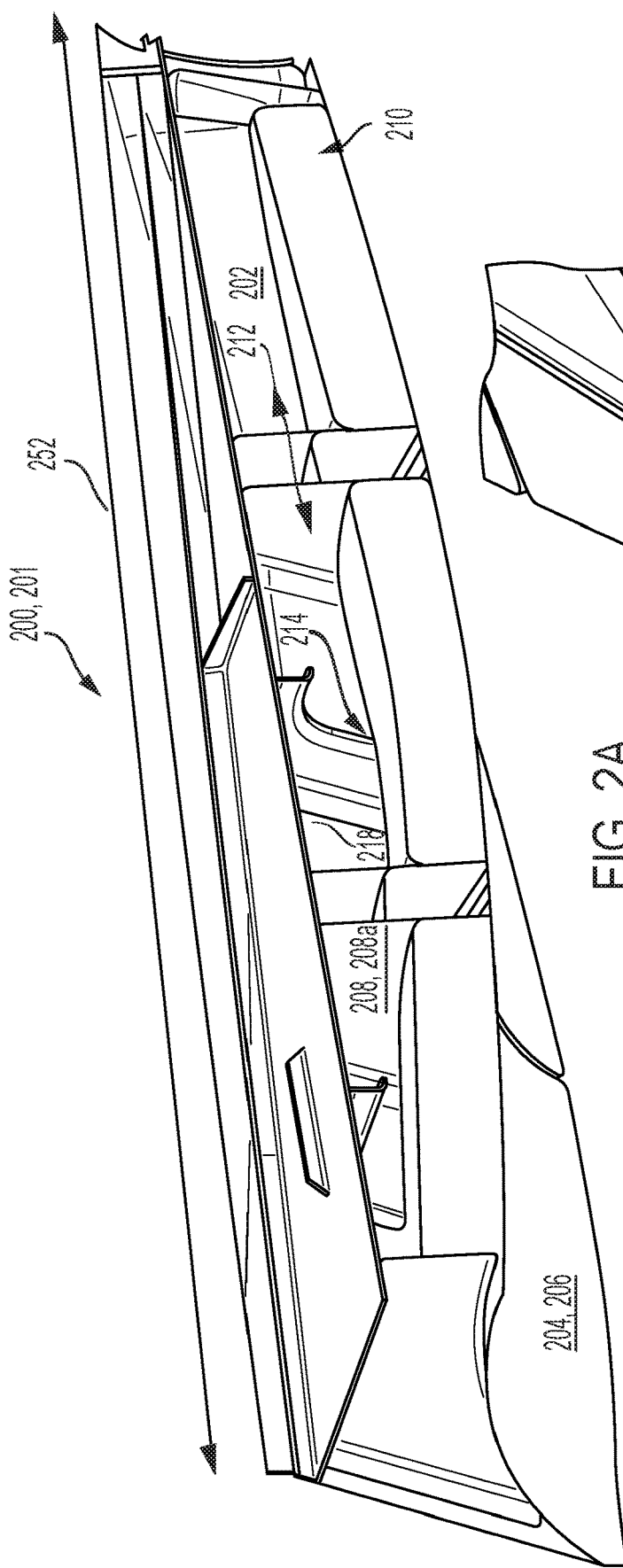
FIG. 2A
FIG. 2B
FIG. 2C

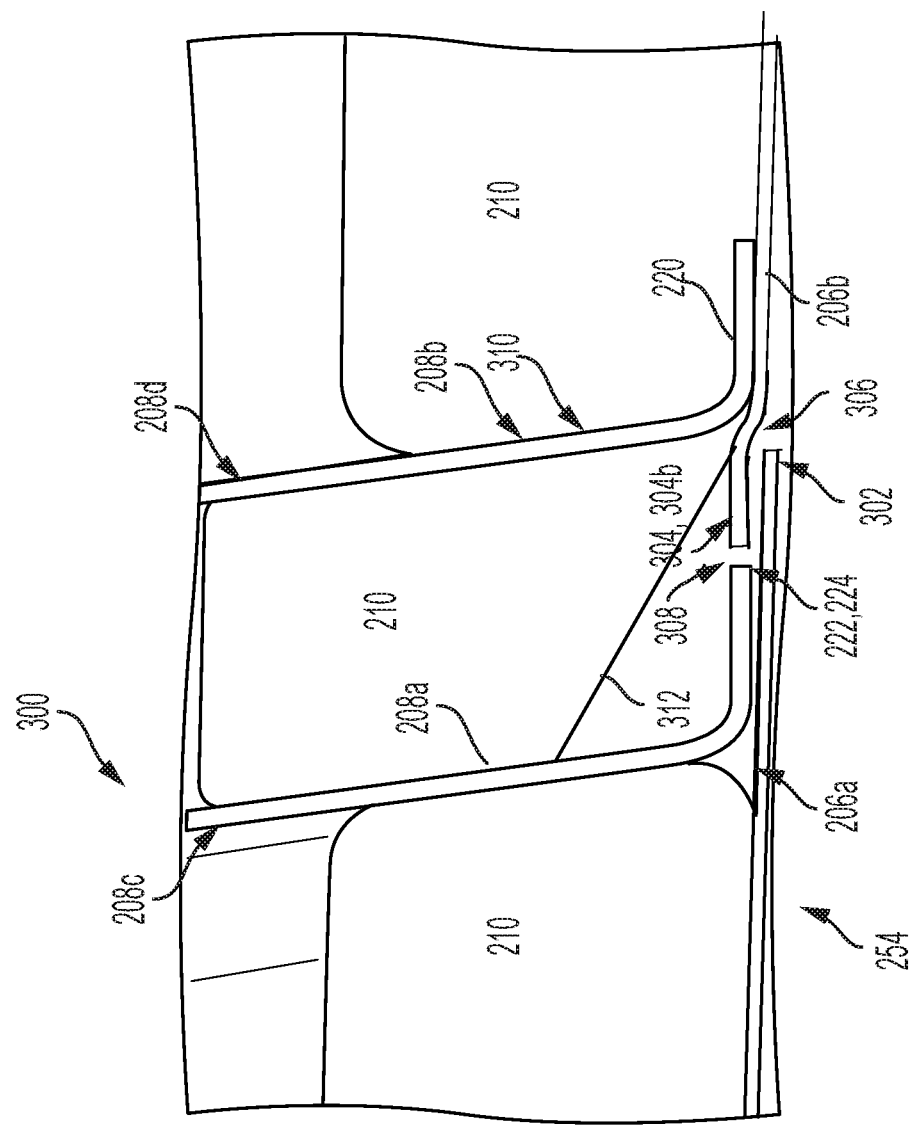

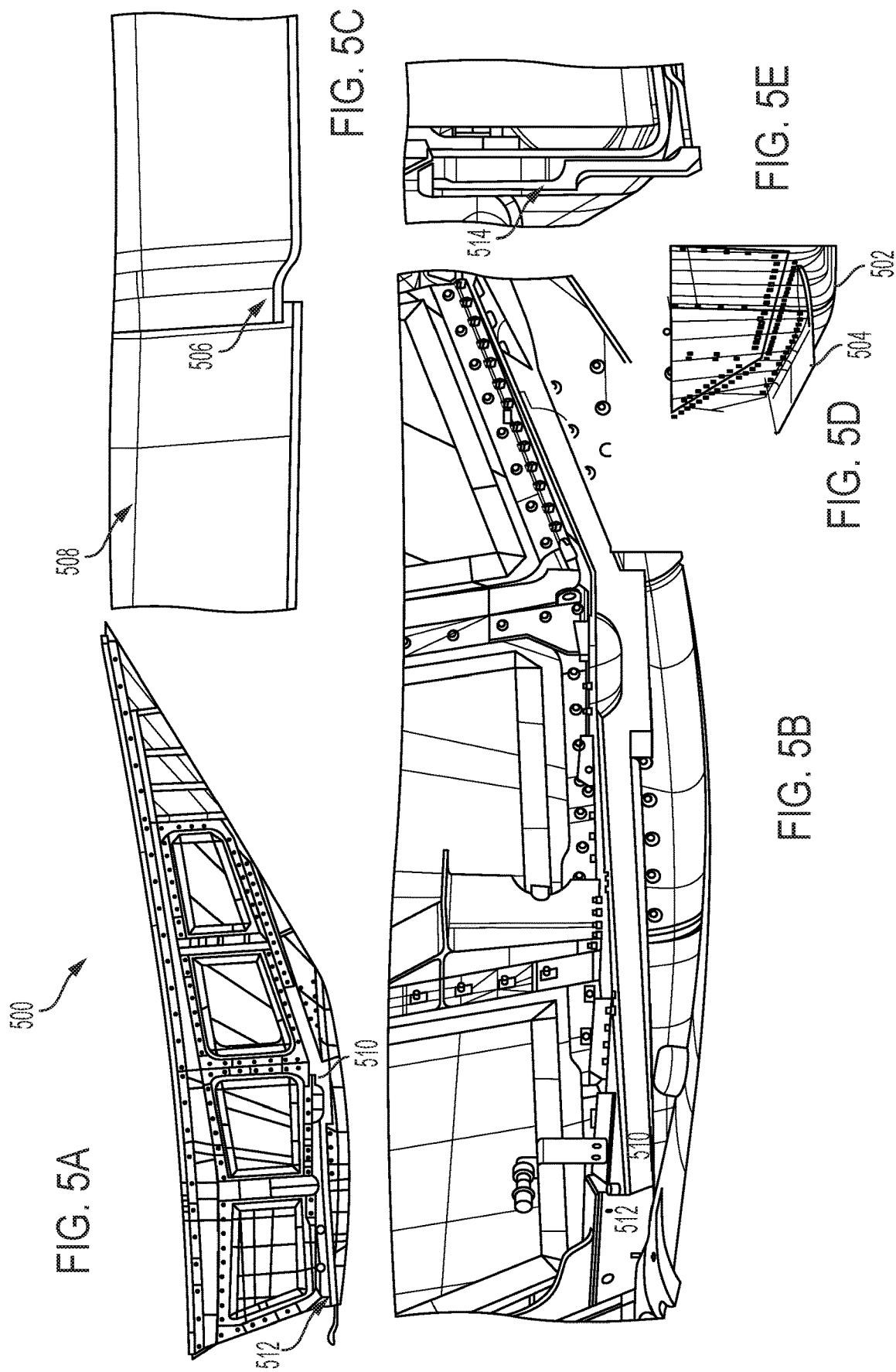

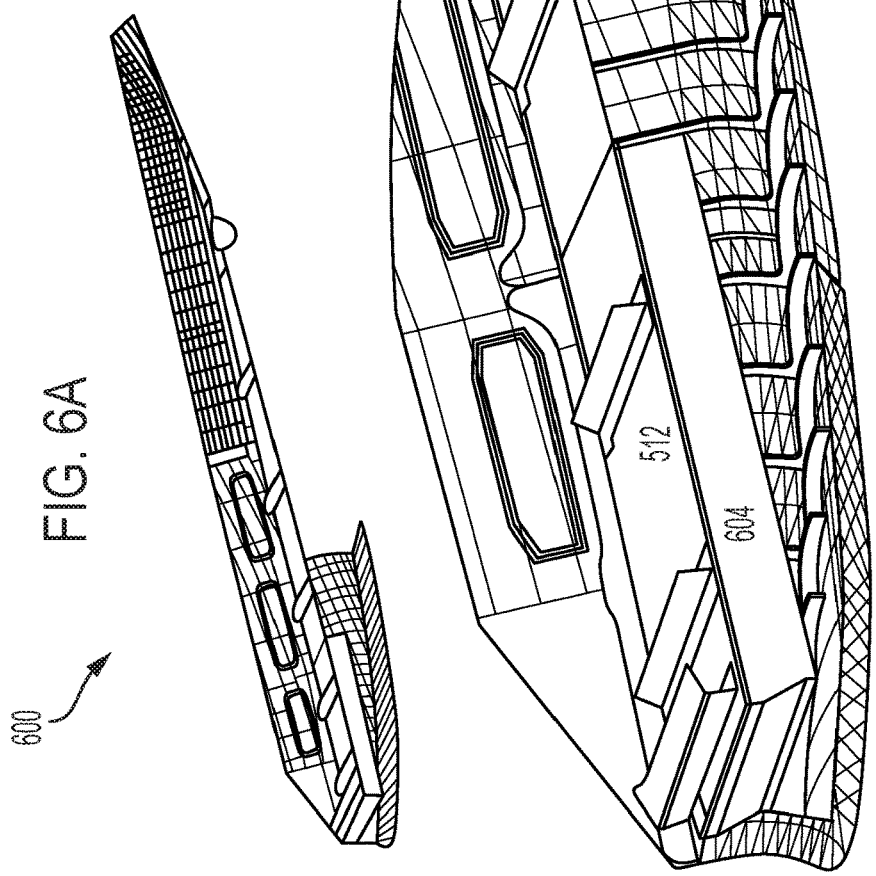
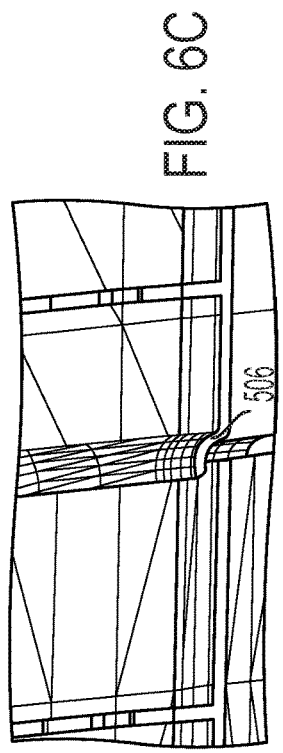
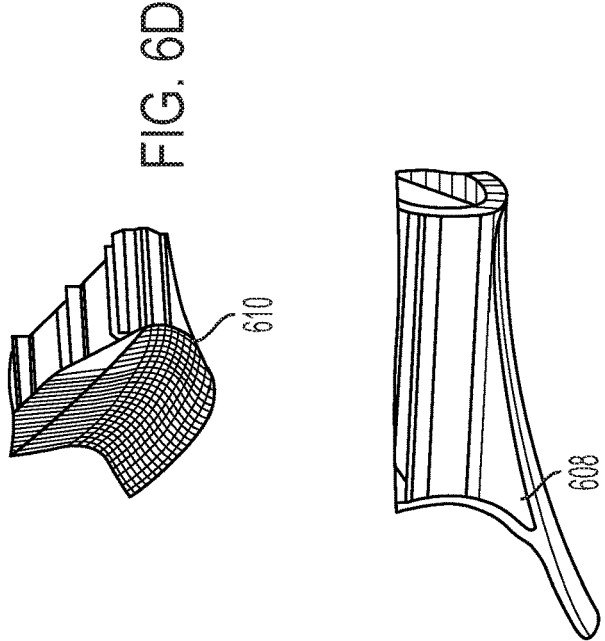
FIG. 6A
FIG. 6B
FIG. 6C
FIG. 6D
FIG. 6E

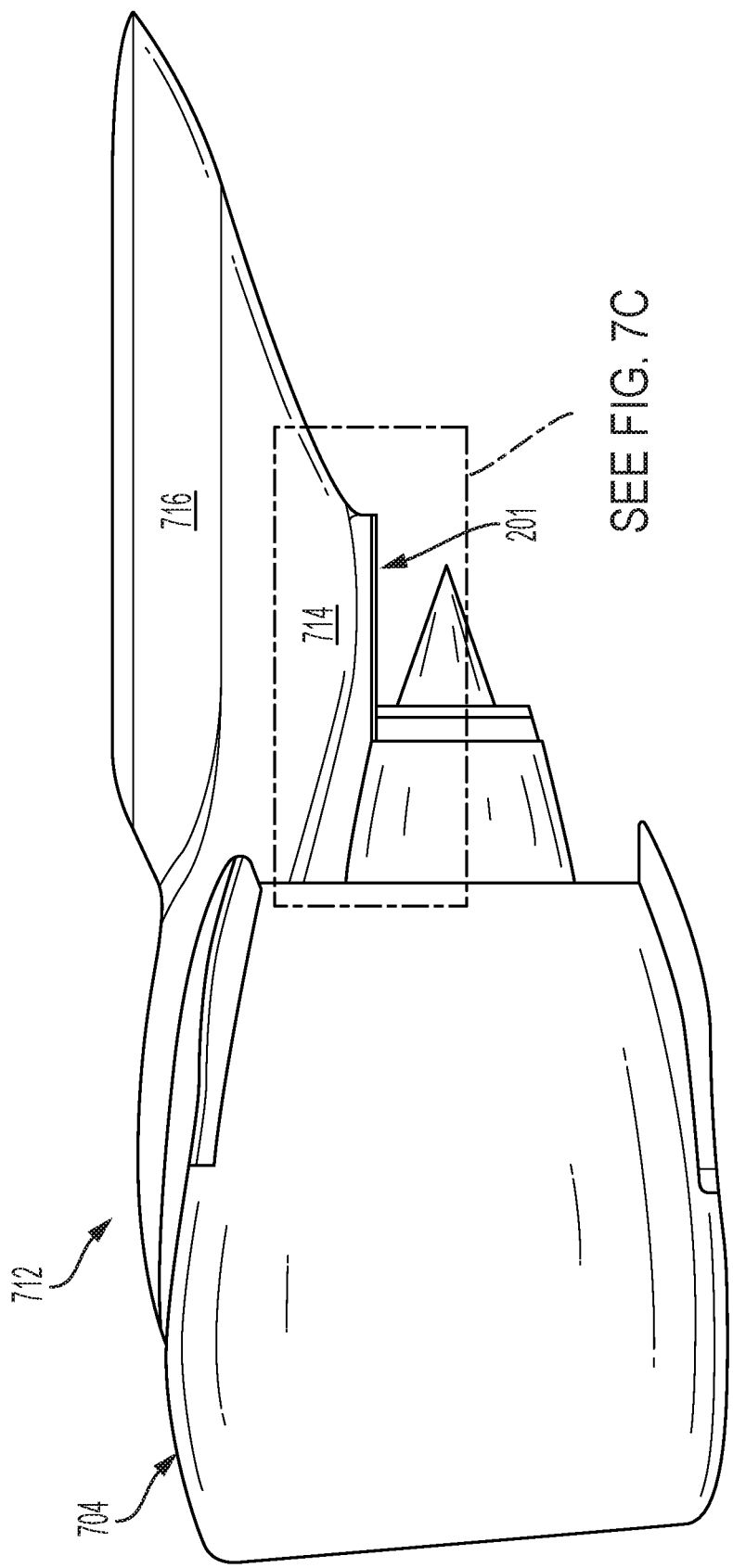

ADVANCED PLUME SUPPRESSING SEGMENTED HEAT SHIELD

BACKGROUND

1. Field

The present disclosure relates to heat shields and methods of making the same.

2. Description of the Related Art

An externally mounted aircraft engine is typically attached to the associated aircraft by a pylon. As one example, the pylon may couple the engine to a wing of the aircraft (e.g., the engine may be suspended below the wing by way of the pylon). As shown in FIG. 1, each engine 16 of the aircraft 10 includes an inlet side 22 and an outlet side 24 longitudinally opposed from the inlet side 22. Therefore, each engine 16 of the aircraft 10 outputs an exhaust gas 26 that propels the aircraft 10 in the forward direction (arrow F). Due to proximity with the aircraft engine, particularly with the hot exhaust gases emanating from the aircraft engine, a pylon fairing typically includes a heat shield. For example, the aft pylon fairing on a commercial aircraft can include a heat shield 100 as a subcomponent thereof. The heat shield assembly 100 may be positioned proximate the outlet side 24 of the engine 16, such as proximate an exhaust nozzle 28, such that the heat shield assembly 100 is disposed between the exhaust gas 26 and the bulk 30 of the pylon fairing 20 and the wing 14 of the aircraft. A typical heat shield includes skin panels attached to frame members to define an internal volume/compartments. The internal volume/compartments of the heat shield may be filled with a thermal insulation material.

The skin panels of a heat shield are formed from various heat-resistant materials, such as aerospace-grade titanium alloys. Nonetheless, the skin panels of a heat shield may be susceptible to buckling when heated, particular on larger aircraft where the distance between adjacent frame members is greater.

Accordingly, those skilled in the art continue with research and development efforts in the field of aircraft heat shields. The present disclosure satisfies this need.

SUMMARY

The present disclosure describes a heat shield for exhaust gas generated in a gas turbine engine. The heat shield can be embodied in many ways including, but not limited to, the following.

1. A heat shield comprising an interior; a skin enclosing the interior; a plurality of barriers attached in the interior to the skin, each of the barriers spaced to separate a plurality of thermal insulation layers disposed in the interior; and wherein the barriers suppress heat flow between the thermal insulation layers.

2. The structure of example 1, wherein the barriers each comprise a close out frame supporting the skin.

3. The structure of example 1, wherein:
the skin comprises a plurality of segments,
the heat shield comprises a plurality of joint regions, each of the joint regions:
between a pair of the segments comprising a first segment and a second segment; the first segment comprising a first end overlapping with a second end of the second segment; and
including a gap between the first end and a second end, the gap allowing thermal expansion and contraction of the segments and a flow of an exhaust gas into the interior, the flow of the exhaust gas generating the heat flow; and
the barriers comprise:
a first barrier attached to the first segment at a location having a spacing from the gap so that the flow of the exhaust gas through the gap outputs into the interior through the spacing and along a surface of the first barrier, and
a second barrier attached to the second segment.

4. The structure of example 3, further comprising the thermal insulation layers resting on the segments on an underside of the heat shield.

5. The structure of example 4, wherein one of the thermal insulation layers is between the first barrier and the second barrier, the one of the thermal insulation layers having an angled surface angling away from the spacing and the gap to allow the flow of the exhaust gas into the interior through the spacing.

6. The structure of example 5, wherein:
the first barrier comprises a frame supporting the skin and a flange attaching to the first segment, and
a third end of the flange is at the location having the spacing from the gap.

7. The structure of example 1, wherein:
the skin comprises a lower skin connected to a first side skin and a second side skin,
the lower skin meets the first side skin along a first edge of the heat shield,
the lower skin meets the second side skin along a second edge of the heat shield,
a first cross section of the heat shield between the first side skin and the lower skin includes a first triangular region having a first vertex on the first edge, and
a second cross section of the heat shield between the second side skin and the lower skin includes a second triangular region having a second vertex on the second edge.

8. The structure of example 7, wherein the barriers each comprise a close out frame attached to the lower skin and the first side skin or the second side skin, the close out frame supporting the lower skin and the first side skin or the second side skin.

9. The structure of example 8, further comprising a plurality of stiffeners on an interior surface of the side skins.

10. The structure of example 8, wherein the close out frames end before the first edge or the second edge so as to form a first opening in the interior between the first edge and the barriers, or a second opening between the second edge and the barriers, thereby allowing flow of the exhaust gas in the opening along a length of the heat shield.

11. The structure of example 10, wherein each of the barriers direct the flow of the exhaust gas along a surface of the barrier towards the openings.

12. A jet engine comprising:
a nacelle,
an aerodynamic fairing including a forward strut fairing attached to the nacelle, an aft fairing attached to an aft portion of a wing, and an underwing fairing attached between the forward strut fairing and the aft fairing, the aft fairing further comprising the heat shield of example 1.

13. The structure of example 1, wherein the skin is formed using superplastic forming.

14. An aircraft including the structure of example 1 and a jet engine, the exhaust gas propelling the aircraft and the heat shield shielding the aircraft from the exhaust gas.

15. The structure of any of the preceding examples 1, further comprising:

the skin including a first side skin; a second side skin; and a lower skin;

a first interface between the lower skin and the first side skin;

a second interface between the lower skin and the second side skin, wherein:

the lower skin includes a first segment and a second segment;

the first side skin and the second side skin each include a third segment and a fourth segment;

the first segment comprises a first side portion and a first edge portion, the second segment comprises a second side portion and a second edge portion, the third segment comprises a third side portion and a third edge portion, and the fourth segment comprises a fourth side portion and a fourth edge portion, and the first interface and the second interface each comprise:

a first region including:

the first edge portion joined to, and in physical contact or mechanical contact with, the third edge portion, and the second edge portion joined to, and in physical contact or mechanical contact with, the fourth edge portion; and a second region of the interface inwards of the first region, wherein the second side portion and the fourth side portion extend between the first side portion and the third side portion.

The present disclosure further describes a method of making a heat shield. The method can be embodied in many ways including, but not limited to, the following.

16. The method comprising:

providing a skin for enclosing an interior of the heat shield; and attaching a plurality of barriers to the skin, each of the barriers spaced to separate a plurality of thermal insulation layers disposed in the interior; and wherein the barriers suppress heat flow between the thermal insulation layers.

17. The method of example 16 further comprising resting the thermal insulation layers on the skin on an underside of the heat shield.

18. The method of example 16 or 17 further comprising:

providing the skin including a plurality of segments, providing the heat shield comprising a plurality of joint regions, each of the joint regions:

between a pair of the segments comprising a first segment and a second segment; the first segment comprising a first end overlapping with a second end of the second segment; and including a gap between the first end and a second end, the gap allowing thermal expansion and contraction of the segments and a flow of exhaust gas into the interior, the flow of exhaust gas generating the heat flow; and attaching the barriers comprising a first barrier and a second barrier:

the first barrier attached to the first segment at a location having a spacing from the gap so that the flow of the exhaust gas through the gap outputs into the interior through the spacing and along a surface of the first barrier, and the second barrier attached to the second segment.

19. The method of example 18, wherein the first barrier comprises a frame supporting the skin and a flange, the method further comprising attaching the flange to the first segment so that a third end of the flange is at the location having the spacing from the gap.

20. The method of example 19, wherein the skin comprises a lower skin connected to a first side skin and a second side skin, the method further comprising:

connecting the lower skin so that the lower skin:

meets the first side skin along a first edge of the heat shield, meets the second side skin along a second edge of the heat shield, a first cross section of the heat shield between the first side skin and the lower skin includes a first triangular region having a first vertex on the first edge, and a second cross section of the heat shield between the second side skin and the lower skin includes a second triangular region having a second vertex on the second edge.

21. The method of example 20, wherein the barriers each comprise a close out frame, the method further comprising attaching the close out frame to the lower skin and the first side skin or the second side skin, wherein:

the close out frame support the lower skin and the first side skin or the second side skin; and the close out frames end before the first edge or the second edge so as to form a first opening in the interior between the first edge and the barriers, or a second opening between the second edge and the barriers, thereby allowing flow of the exhaust gas in the opening along a length of the heat shield; and providing a plurality of stiffeners on an interior surface of the side skins.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

FIG. 2A illustrates a perspective view of a heat shield according to one or more examples described herein.

FIG. 2B illustrates a side view of the heat shield in FIG. 2A.

FIG. 2C illustrates a close up view of the heat shield in FIG. 2A, showing the barriers end so as to form an opening in the interior between the edge of the heat shield and the barriers.

FIG. 3 illustrates a close up inside view of the heat shield of FIG. 2A, according to one or more examples described herein.

FIG. 5A a side view of a heat shield, FIG. 5B illustrates a perspective view of the heat shield of FIG. 5B, showing the heat shield comprising segmented skins formed using a superplastic forming process wherein the thermal insulation suspended is from a spar and the skins on the heat shield do not meet at a v-point, FIG. 5C shows a z shaped overlap between skin segments in the heat shield, FIG. 5D shows a plume suppressor on the exterior of the heat shield, and FIG. 5E shows a scoop on the heat shield.

FIG. 6A illustrates a segmented heat shield formed using casting, including thermal insulation suspended from a spar, castings with ribs, a plume suppressor integral to the casting shape, and a joint between the castings having a z shape, FIG. 6B is a close up view of FIG. 6A, FIG. 6C shows a z shaped overlap between skin segments in the heat shield of FIG. 6A, FIG. 6D shows a plume suppressor on the exterior of the heat shield and integral to the casting, and FIG. 6E shows a scoop in the heat shield.

FIG. 7B illustrated attachment of the heat shield to the aft fairing attached to the pylon attached to a jet engine, according to one or more examples described herein.

DESCRIPTION

Figure 1:
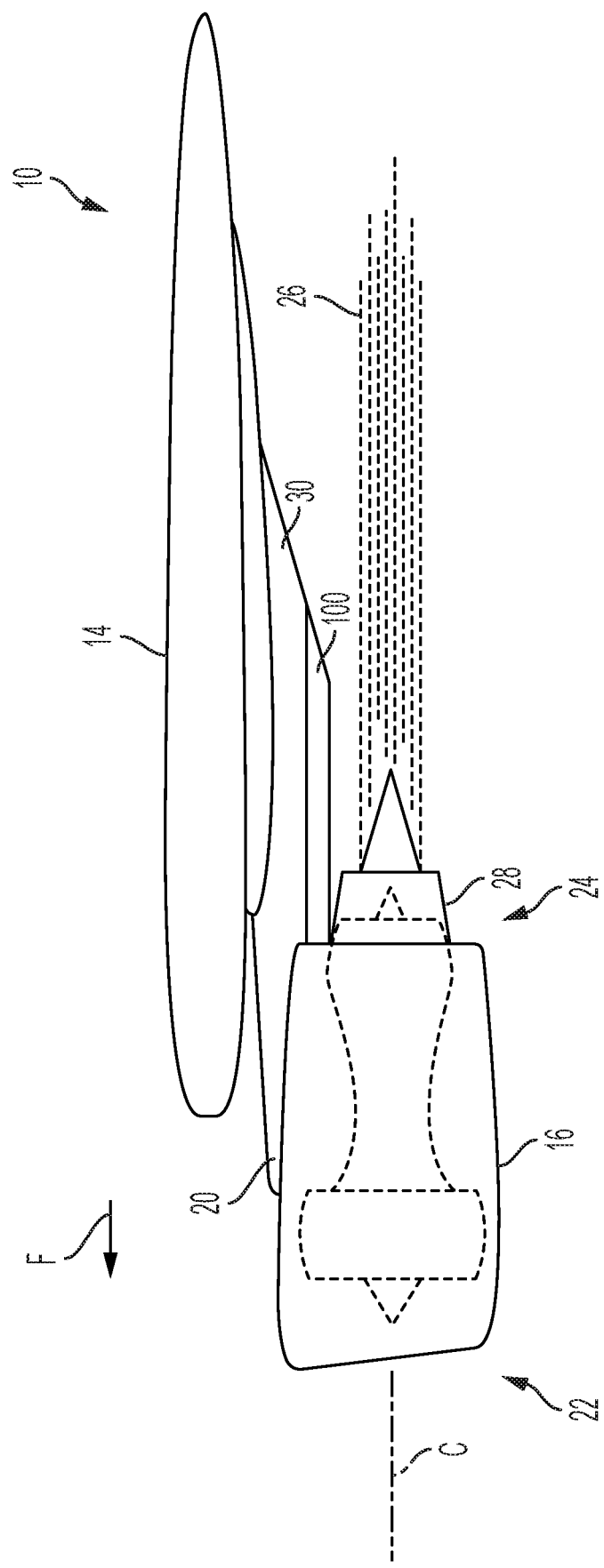
FIG. 1 illustrates a schematic perspective view of an aircraft incorporating a heat shield assembly.

In the following description, reference is made to the accompanying drawings which form a part hereof, and which is shown, by way of illustration, several embodiments. It is understood that other embodiments may be utilized and structural changes may be made without departing from the scope of the present disclosure.

Technical Description

The present disclosure describes a segmented heat shield including barriers that reduce the amount of thermal insulation in the heat shield exposed directly to the exhaust gas of a jet engine. The barriers, e.g., having a closeout frame geometry, also restrict the exhaust gas flow in the heat shield cavity so as to suppress flow of heat between thermal insulation layers. In one or more examples, the thermal insulation uniquely rests on the lower skin of the heat shield, instead of being suspended from the spars, so as to further reduce exposure to the exhaust gas.

Barrier Examples

FIGS. 2A-2C and FIG. 3 illustrate a structure 200 comprising a heat shield 201. The heat shield 201 includes an interior 202; a skin 204 comprising a plurality of segments 206 (skin segments) enclosing the interior 202 (e.g., cavity); and a plurality of barriers 208 (e.g., frames 208a or close out frames 208b) attached in the interior 202 to the skin 204. Each of the barriers 208 are spaced to separate a plurality of thermal insulation layers 210 disposed in the interior 202. The barriers suppress heat flow 212 between the thermal insulation layers 210.

The thermal insulation layers suppress heat flow above the heat shield or insulate the regions above the heat shield from the heat flow. The thermal insulation layer may be provided in various physical forms (e.g., foams, monoliths, bulk material, sheets, blankets, etc.), without departing from the scope of the present disclosure. As one specific, non-limiting example, the thermal insulation material may be (or may include) ceramic material padding a cotton/fiberglass core, or aluminum oxide fibers, aluminum oxide fibers commercially available from Saffil Ltd. of Cheshire, United Kingdom.

FIG. 2A and FIG. 3 further illustrate the heat shield 201 comprises a plurality of joint regions 300. Each of the joint regions 300 are between a pair of the segments 206 comprising a first segment 206a overlapping with a second segment 206b. A first end 302 of the first segment 206a overlaps with a second end 304 of the second segment 206b so that a gap 306 is formed between the first end 302 and the second end 304. In various examples, the second segment comprises a curved portion 304b, including the second end 304, that curves, bends, or has a curvature so as to overlap the first end. The gap 306 allows thermal expansion and/or contraction of the segments 206 in response to a flow of exhaust gas (from the jet engine) into the interior 202. As illustrated in FIG. 2A and FIG. 3, the barriers comprise a first barrier 208c attached to the first segment at a location 224 having a spacing 308 from the gap 306, so that the flow of exhaust gas through the gap outputs into the interior through the spacing 308. A second barrier 208d is attached to the second segment. In the example illustrated in FIG. 3, the first barrier 208c comprises a flange 220 attaching to the first segment, and a third end 222 of the flange 220 is at the location 224 having the spacing 308 from the gap 306. The spacing 308 re-directs or turns the flow of exhaust gas (e.g., through 90 degrees or an angle in a range of 60-120 degrees) in a direction along a face or surface 310 of the first barrier 208c and away from adjacent thermal insulation layers. In one or more examples, the spacing 308 has a length (between the first end and the second end) in a range of ⅟₁₀ inch to 1 inch. In this example, the exhaust gas makes at least two turns, one through the gap 306 between the segments 206 and one through the spacing 308 between the gap 306 and the barrier 208 (e.g., first barrier 208c).

FIG. 2A and FIG. 3 further illustrate a plurality of the thermal insulation layers 210 resting or sitting (e.g., through gravity and/or using adhesive) in the interior 202 on the segments 206 on an underside 254 of the heat shield 201. One of the thermal insulation layers 210 is between the first barrier 208c and the second barrier 208d and has an angled surface 312 angled away from the gap 306 and the spacing 308 to allow the flow of the exhaust gas into the interior through the gap 306 and the spacing 308.

Plume Suppressor Examples

Figure 4A:
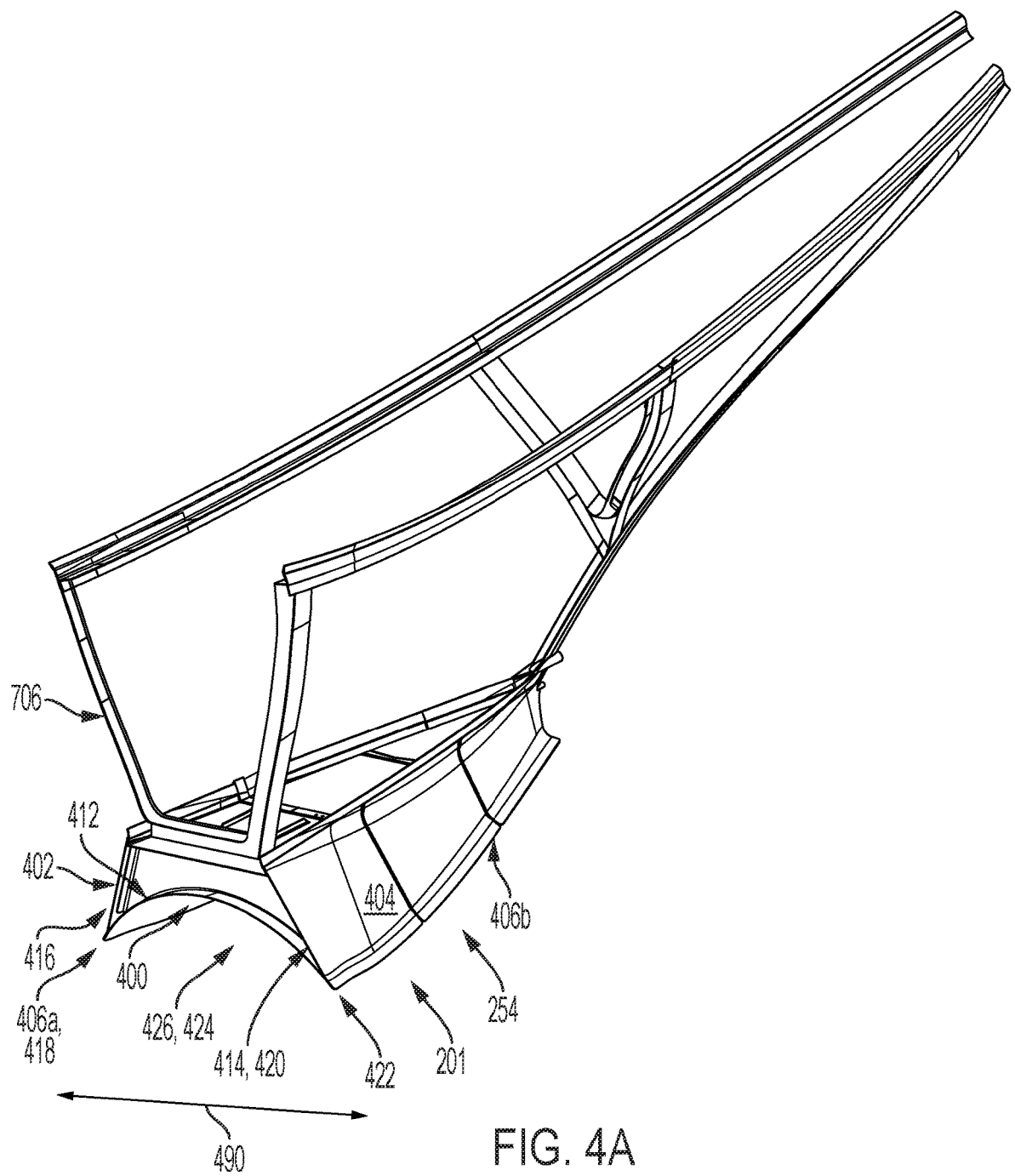
FIG. 4A illustrates a third view of a heat shield according to one or more examples described herein.

FIG. 4A illustrates the skin 204 comprises the lower skin 400 (comprising a lower skin) connected to a first side skin 402 and a second side skin 404. The lower skin meets the first side skin 402 along a first edge 406a of the heat shield 201 and the lower skin meets the second side skin 404 along a second edge 406b of the heat shield. A first cross section 412 of the heat shield between the first side skin and the lower skin includes a first triangular region 416 or first V-shaped region having a first vertex 418 on the first edge 406a. A second cross section 414 of the heat shield between the second side skin 404 and the lower skin includes a second triangular region 420 (e.g., second V-shaped region) having a second vertex 422 on the second edge. The first triangular region and the second triangular region confine the exhaust gas 424 under the lower skin so as to suppress flow 426 of the exhaust gas 424 curling up along the first side skin 402 and/or the second side skin 404 towards the top T of the heat shield where more temperature sensitive regions of the structure 200.

Figure 4B:
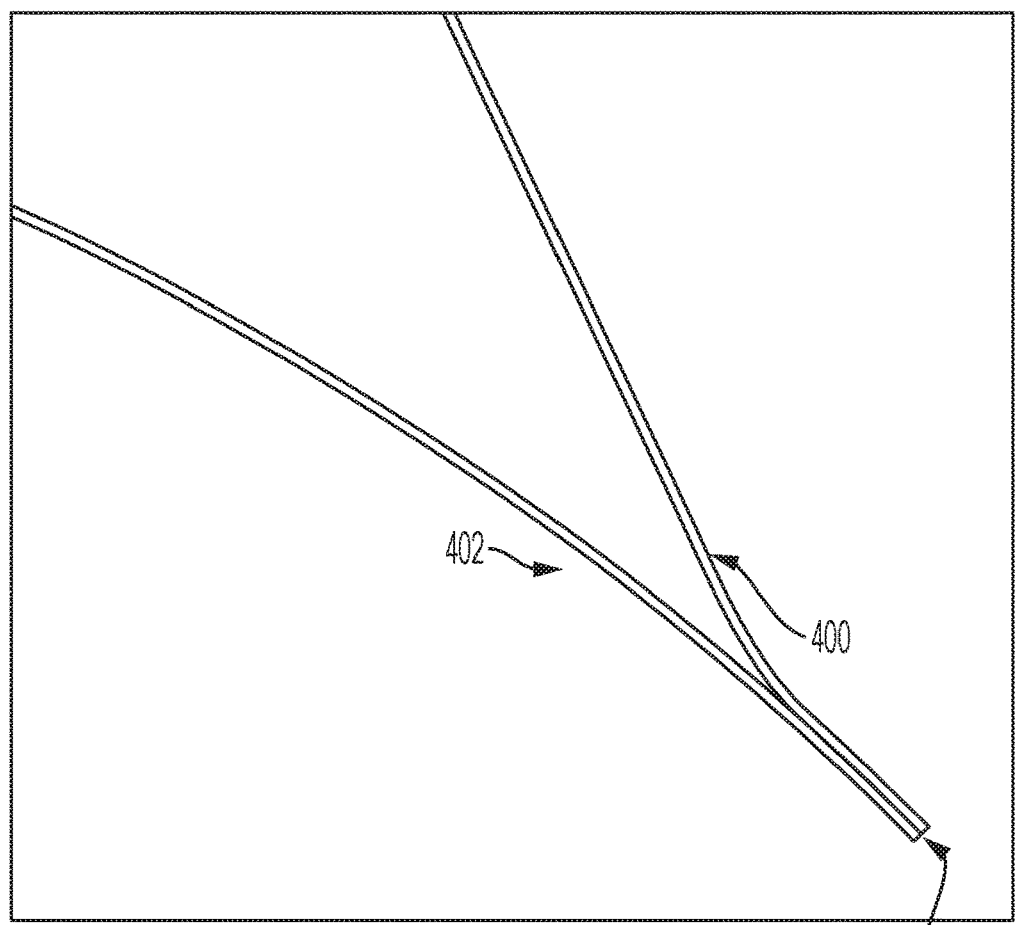
FIG. 4B illustrates a joints between a side skin of the skin and a lower skin of the skin, according to one or more examples described herein.

FIG. 4B further illustrates the first triangular region 416 and the second triangular region 420 (e.g., comprising V-shaped regions) are not formed using a single piece but are joined so that a joint between the lower skin 400 and the first side skin 402 forming the first vertex 418, or a joint between the lower skin 400 and the second side skin 404 forming the second vertex 422, both comprise a skin to skin joint 430, which may be symmetrical.

FIGS. 2A-2C further illustrate the barriers 208 end before the first edge 406a or the second edge 406b so as to form a first opening 216a in the interior 202 between the first edge 406a and the barriers 208 on the first side skin, or a second opening 216b between the second edge 406b and the barriers 208 on the second side skin, thereby allowing flow of the exhaust gas out of the interior 202 along the length 252 of the heat shield 201. Therefore, closeout frame geometry combined with the segmentation interfaces are configured to further restrict flow of the exhaust gas 424 (from the jet engine 702) into the interior 202 or cavity of the heat shield 201.

Example Interface Between Segments

Figure 4C:
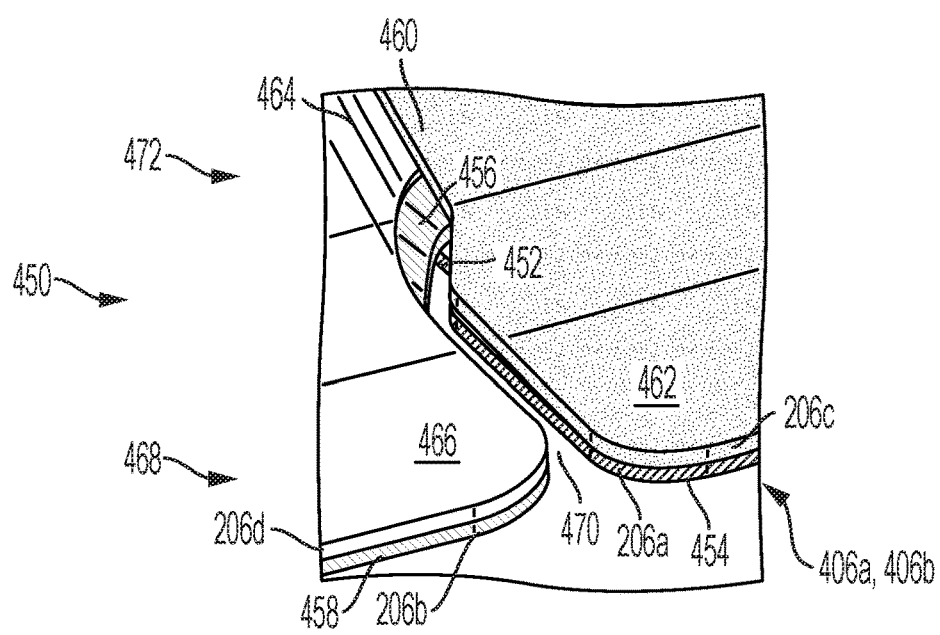
FIG. 4C illustrates a close up view of the heat shield of FIG. 2A, showing the interface including an overlap between four segments of the lower skin and the side skin.

FIG. 4C illustrates an example first interface 450a between the lower skin 400 and the first side skin 402 along the first edge 406a or a second interface 450b between the lower skin 400 and the second side skin 404 along the second edge 406b. The lower skin 400 includes the pairs of segments 206 comprising the first segment 206a and the second segment 206a. The first side skin 402 and the second side skin 404 each further include pairs of segments 206 comprising a third segment 206c and a fourth segment 206d. The first segment 206a comprises a first side portion 452 and a first edge portion 454, the second segment comprises a second side portion 456 and a second edge portion 458, the third segment comprises a third side portion 460 and a third edge portion 462, and the fourth segment comprises a fourth side portion 464 and a fourth edge portion 466.

The interface comprises a first region 468 including the first edge portion 454 joined to, and in physical contact or mechanical contact with, the third edge portion 462 along the first edge 406a or the second edge 406b of the heat shield; and the second edge portion 458 joined to, and in physical contact or mechanical contact with, the fourth edge portion 466 along the first edge or the second edge of the heat shield. In the first region 468, the first side portion is spaced laterally apart with a second gap 470 from the second side portion so that the first side portion and the second side portion do not overlap. In the first region, the third side portion is spaced laterally apart with a second gap 470 from the fourth side portion so that the third side portion and the fourth side portion do not overlap.

In a second region 472 of the interface inwards (away from the first edge or the second edge) of the first region 468, the second side portion 456 and the fourth side portion 464 are shaped or curved (e.g, cut) to extend a limited distance between the first side portion 452 and the third side portion 460. In one or more examples, the second region 472 comprises a stack including the first side portion 452, the second side portion 456 overlaying the first side portion 452, the fourth side portion 464 overlaying the second side portion 456, and the third side portion 460 overlaying the fourth side portion 464.

Stiffener Example

FIG. 2A and FIG. 4A further illustrate a plurality of stiffeners 214 on an interior surface 218 of the first side skin 402 (supporting the first side skin 402) and/or on an interior surface 218 of the second side skin 404 (supporting the second side skin 404). In one or more examples, the stiffeners are also connected to the lower skin but only extend to a distance of less than 10% of the total width 490 of the lower skin. The stiffeners reduce vibration of the first side skin or the second side skin caused by the exhaust gas 424 outputted from the jet engine 702.

Example Control of the Number of Segmented Skins

The number of segments can be selected to control thermal growth of the heat shield and allow each segment of the heat shield to independently expand in response to heat generated by the exhaust gas. The number and positioning of the barriers and segments can be selected and increased as compared to conventional designs to dissipate thermal expansion so that each of the thermal insulation layers can independently expand in response to the heat.

Comparison with Conventional Segmented Heat Shield

FIGS. 5A-5E illustrate a current segmented heat shield 500 formed using superplastic forming. Although the heat shield is segmented, the design is smaller with less segmentation. The rounded (non-V shape) surface 502 of the heat shield 500 requires an asymmetrically positioned plume suppressor 504 to be attached to the heat shield. Moreover, the z-shaped overlap 506 between the segments 508 provides for only one 90 degree turn in exhaust gas path, resulting in all of the thermal insulation blankets 510 being exposed to the exhaust gas from the jet engine. The example illustrated in FIGS. 5A-5E does not include close out frames, ribs, or stiffeners and the thermal insulation blankets 510 are suspended from a spar 512.

Comparison with Casted Heat Shield

FIGS. 6A-6E illustrate a casted heat shield 600. Although the heat shield is segmented, the design includes less segmentation and the heat shield is formed using casting 602, resulting in reduced tolerance and increased weight. The z-shaped overlap 506 between the casting provides for only one 90 degree turn in exhaust gas path, resulting in all of the thermal insulation 604 suspended from the spar 512 being exposed to the jet engine exhaust. Ribs 606 are formed integrally with the casting and extend along an entire length of the side skin and lower skin, increasing weight. Moreover, the casted heat shield includes an integral frame 608 that that closes out the front of the heat shield undesirably trapping the exhaust gas in the heat shield. The plume suppressor comprises an integral plume suppressor 610 that is integral to the casting's shape.

Comparison with Non-Segmented Heat Shield

Non-segmented (single piece) heat shields cause increased drag caused by skin deflections and buckling of the entire single piece heat shield in response to heat loads. The thermal stresses for the longer single piece of material are significantly higher than segmented heat shields experience and can cause cracking of the heat shield and/or the thermal insulation layers.

Example: Aircraft Installation

Figure 7A:
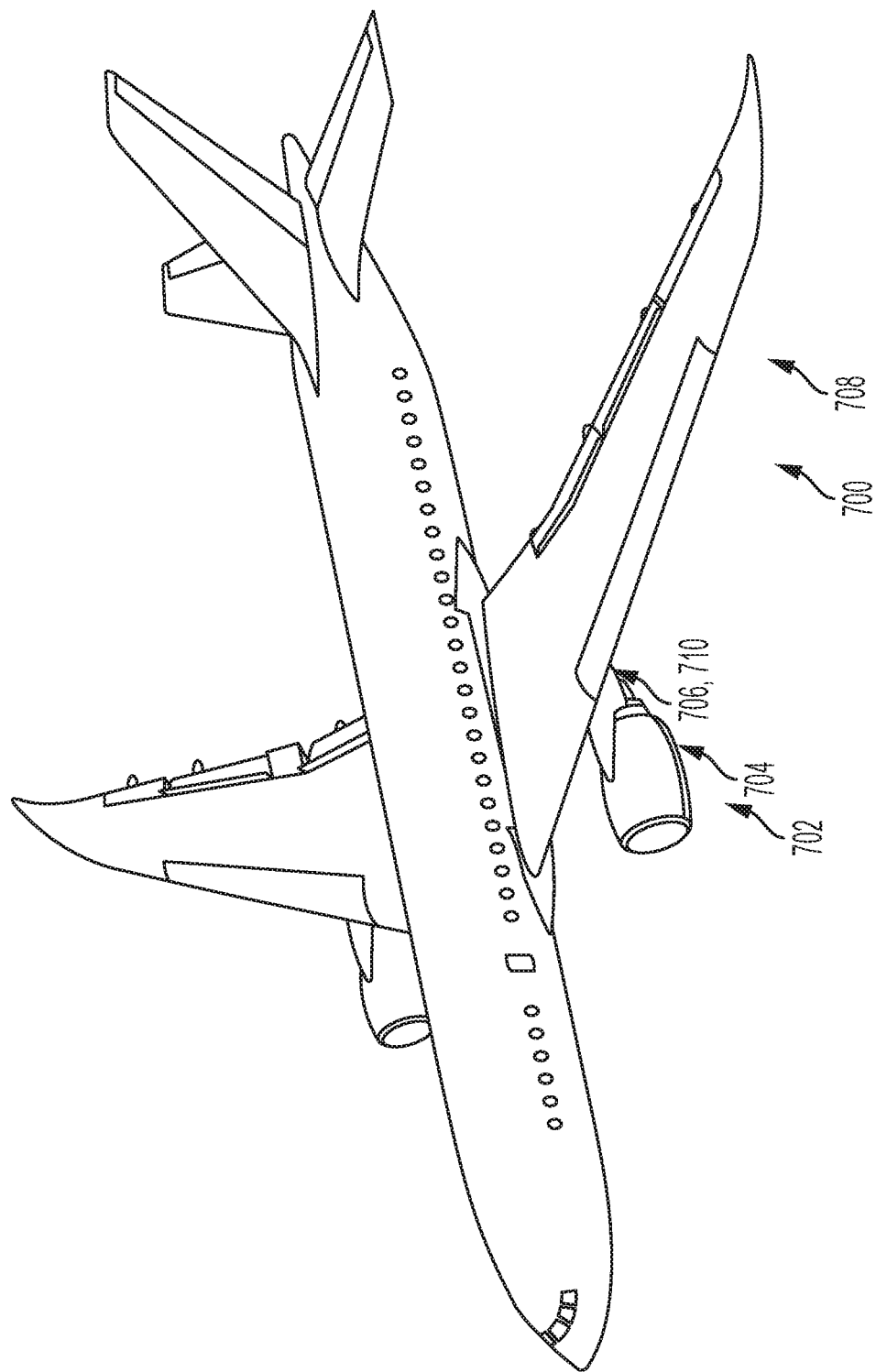
FIG. 7A illustrates an aircraft including a heat shield according to one or more examples described herein.
Figure 7C:
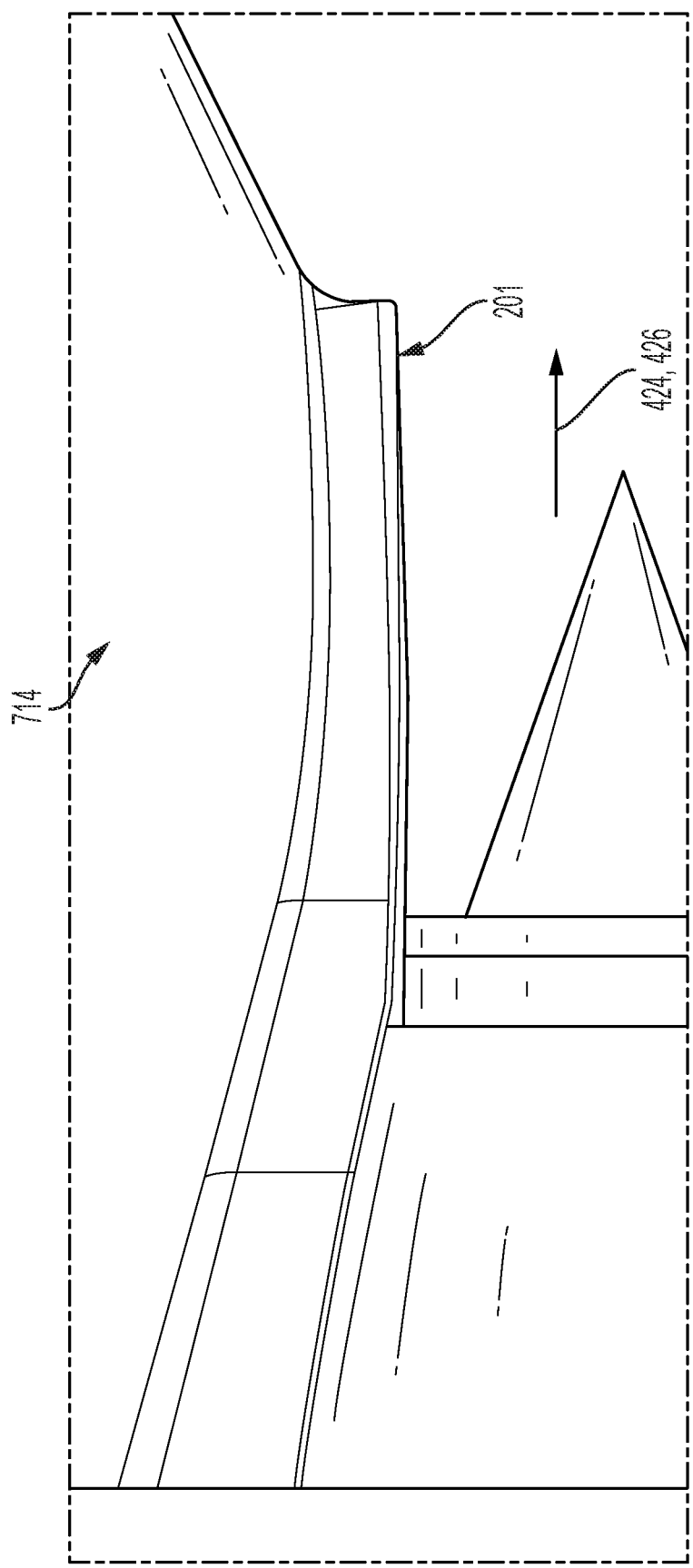
FIG. 7C is a close up view of FIG. 7B showing the heat shield.

FIG. 7A illustrates an aircraft 700 including a jet engine 702 comprising a nacelle 704, and a pylon 706 connecting the jet engine 702 to a wing 708. The pylon 706 includes aerodynamic fairings 710 that include or are connected to the heat shield 201 according to examples described herein. As illustrated in FIG. 7A, FIG. 7B and FIG. 7C, the aerodynamic fairings 710 include a forward strut fairing 712 attached to the nacelle 704, an aft fairing 714, and an underwing fairing 716 between the aft fairing 714 and the forward strut fairing 712. In one or more examples, the aft fairing 714 further comprises or is connected to the heat shield 201 according to examples described herein.

Process Steps

Figure 8:
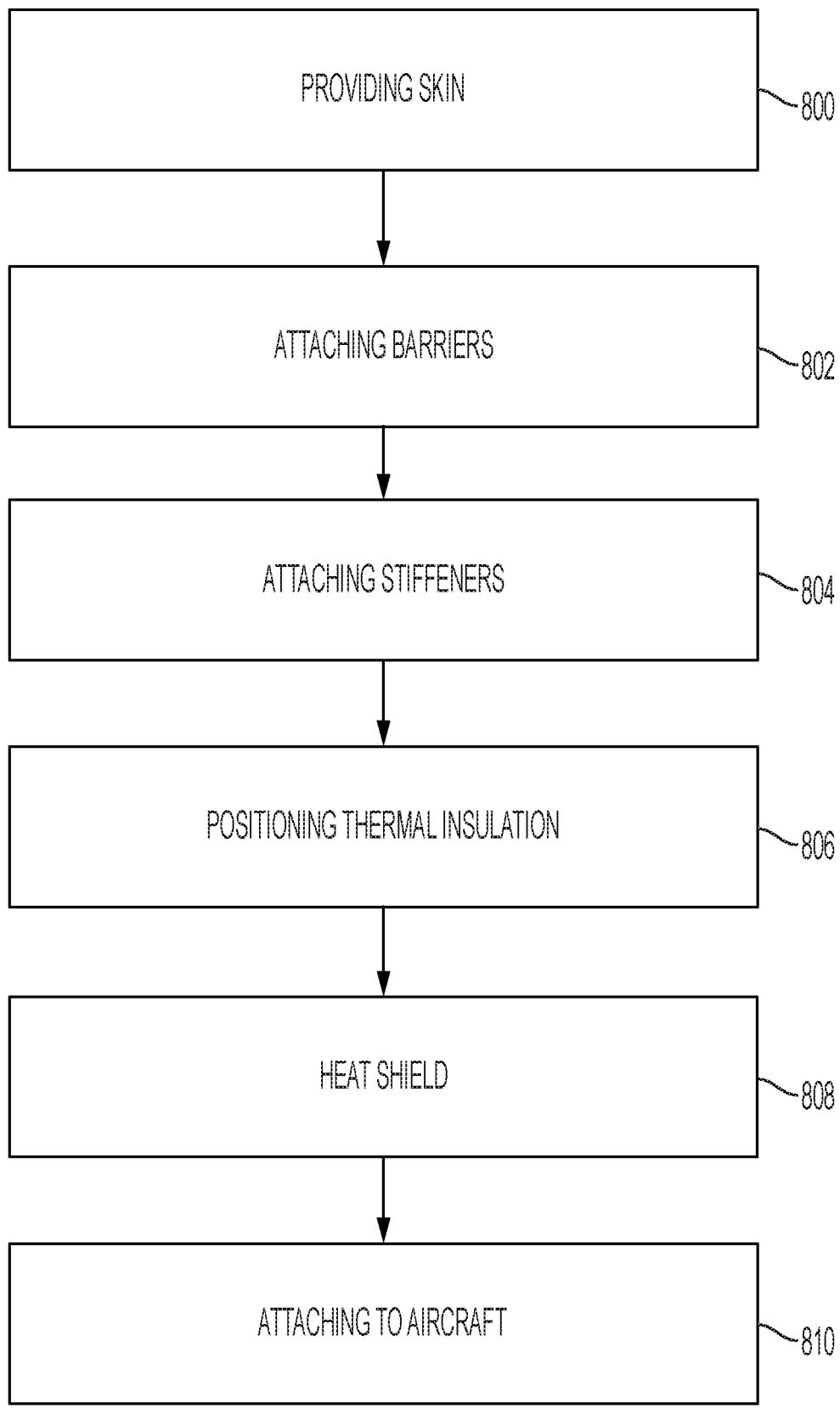
FIG. 8 is a flowchart illustrating a method of making a heat shield according to one or more examples described herein.

FIG. 8 is a flowchart illustrating a method of making a heat shield.

Block 800 represents providing a skin for enclosing an interior of the heat shield. In one or more examples, the heat shield includes a skin including a plurality of segments, e.g., that are formed using a superplastic forming process. In one or more examples, the segments include a first side skin, a second side skin, and a lower skin.

Block 802 represents attaching a plurality of barriers to the skin, each of the barriers spaced to separate a plurality of thermal insulation layers disposed in the interior.

Block 804 represents attaching stiffeners to the first side skin and the second side skin.

Block 806 represents positioning thermal insulation layers.

Block 808 represents the end result, a heat shield.

Block 810 represents attaching the heat shield to an aircraft and optionally operating the aircraft including the heat shield.

The heat shield can be embodied in many ways including, but not limited to, the following.

1. An apparatus (e.g., structure (200)), comprising:
a heat shield (201) including:
an interior (202);
a skin (204) enclosing the interior (202);
a plurality of barriers (208) attached in the interior (202) to the skin (204), each of the barriers (208) spaced to separate a plurality of thermal insulation layers (210) disposed in the interior (202); and
wherein the barriers (208) suppress heat flow (212) between the thermal insulation layers (210).

2. The structure (200) of embodiment 1, wherein the barriers (208) each comprise a close out frame (208b) supporting the skin (204).

3. The structure (200) of embodiment 1, wherein:
the skin (204) comprises a plurality of segments (206),
the heat shield (201) comprises a plurality of joint regions (300), each of the joint regions (300):
between a pair of the segments (206) comprising a first segment (206a) and a second segment (206b); the first segment (206a) comprising a first end (302) overlapping with a second end (304) of the second segment (206b); and
including a gap (306) between the first end (302) and a second end (304), the gap (306) allowing thermal expansion and contraction of the segments (206) and a flow (426) of an exhaust gas (424) into the interior (202), the flow (426) of the exhaust gas (424) generating the heat flow (212); and
the barriers (208) comprise:
a first barrier (208c) attached to the first segment (206a) at a location having a spacing (308) from the gap (306) so that the flow (426) of the exhaust gas (424) through the gap (306) outputs into the interior (202) through the spacing (308) and along a surface (310) of the first barrier (208c), and
a second barrier (208d) attached to the second segment (206b).

4. The structure (200) of embodiment 3, further comprising the thermal insulation layers (210) resting on the segments (206) on an underside of the heat shield (201).

5. The structure (200) of embodiment 4, wherein one of the thermal insulation layers (210) is between the first barrier (208c) and the second barrier (208d), the one of the thermal insulation layers having an angled surface (310) angling away from the spacing (308) and the gap (306) to allow the flow (426) of the exhaust gas (424) into the interior (202) through the spacing (308).

6. The structure (200) of embodiment 5, wherein:
the first barrier (208c) comprises a frame (208a) supporting the skin (204) and a flange (220) attaching to the first segment (206a), and
a third end (222) of the flange (220) is at the location having the spacing (308) from the gap (306).

7. The structure (200) of embodiment 1, wherein:
the skin (204) comprises a lower skin (400) connected to a first side skin (402) and a second side skin (404),
the lower skin (400) meets the first side skin (402) along a first edge (406a) of the heat shield (201),
the lower skin (400) meets the second side skin (404) along a second edge (406b) of the heat shield (201),
a first cross section (412) of the heat shield (201) between the first side skin (402) and the lower skin (400) includes a first triangular region (416) having a first vertex (418) on the first edge (406a), and
a second cross section (414) of the heat shield (201) between the second side skin (404) and the lower skin (400) includes a second triangular region (420) having a second vertex (422) on the second edge (406b).

8. The structure (200) of embodiment 7, wherein the barriers (208) each comprise a close out frame (208b) attached to the lower skin (204) and the first side skin (402) or the second side skin (404), the close out frame (208b) supporting the lower skin (400) and the first side skin (402) or the second side skin (404).

9. The structure (200) of embodiment 8, further comprising a plurality of stiffeners (214), each of the stiffeners (214) on an interior surface (218) of the first side skin (402) and/or the second side skin (404).

10. The structure (200) of embodiment 8, wherein the close out frames (208b) end before the first edge (406a) and/or the second edge (406b) so as to form a first opening (216a) in the interior (202) between the first edge (406a) and the barriers (208), and/or a second opening (216b) between the second edge (406b) and the barriers (208), thereby allowing flow (426) of the exhaust gas (424) in the first opening (216a) or the second opening (216b) along a length of the heat shield (201).

11. The structure (200) of embodiment 10, wherein each of the barriers (208) direct the flow (426) of the exhaust gas (424) along a surface (310) of the barrier towards the first opening (216a) or the second opening (216b).

12. A jet engine (702) comprising:
a nacelle (704),
an aerodynamic fairing including a forward strut fairing (712) attached to the nacelle (704), an aft fairing (714) attached to an aft portion of a wing (708), and an underwing fairing (716) attached between the forward strut fairing (712) and the aft fairing (714), the aft fairing (714) further comprising the heat shield (201) of embodiment 1.

13. The structure (200) of embodiment 1, wherein the skin (204) is formed using superplastic forming.

14. An aircraft (700) including a jet engine (702) and the structure (200) of embodiment 1, the aircraft (700) propelled using the exhaust gas (424) outputted from the jet engine (702) and the heat shield (201) shielding the aircraft (700) from the exhaust gas (424). In one or more examples, the heat shield (201) shields the wing (708) or the aircraft's fuselage from the exhaust gas.

15. A method of making a heat shield (201), comprising:
providing a skin (204) for enclosing an interior (202) of the heat shield (201); and
attaching a plurality of barriers (208) to the skin (204), each of the barriers (208) spaced to separate a plurality of thermal insulation layers (210) disposed in the interior (202); and
wherein the barriers (208) suppress heat flow (212) between the thermal insulation layers (210).

16. The method of embodiment 15, further comprising resting the thermal insulation layers (210) on the skin (204) on an underside (250) of the heat shield (201).

17. The method of embodiment 15, further comprising:
providing the skin (204) including a plurality of segments (206), providing the heat shield (201) comprising a plurality of joint regions (300), each of the joint regions (300):
  between a pair of the segments (206) comprising a first segment (206a) and a second segment (206b); the first segment (206a) comprising a first end (302) overlapping with a second end (304) of the second segment (206b); and
  having a gap (306) between the first end (302) and a second end (304), the gap (306) allowing thermal expansion and contraction of the segments (206) and a flow (426) of exhaust gas (424) into the interior (202), the flow (426) of exhaust gas (424) generating the heat flow (212);
  attaching the barriers (208) comprising a first barrier (208c) and a second barrier (208d):
    the first barrier (208c) attached to the first segment (206a) at a location (224) having a spacing (308) from the gap (306) so that the flow (426) of the exhaust gas (424) through the gap (306) outputs into the interior (202) through the spacing (308) and along a surface (310) of the first barrier (208c), and
    the second barrier (208d) attached to the second segment (206b).
18. The method of embodiment 17, wherein the first barrier (208c) comprises a frame (208a) supporting the skin (204) and a flange (220), the method further comprising attaching the flange (220) to the first segment (206a) so that a third end (222) of the flange (220) is at the location (224) having the spacing (308) from the gap (306).
19. The method of embodiment 18, wherein the skin (204) comprises a lower skin (400) connected to a first side skin (402) and a second side skin (404), the method further comprising:
  connecting the lower skin (400) so that the lower skin (400):
    meets the first side skin (402) along a first edge (406a) of the heat shield (201),
    meets the second side skin (404) along a second edge (406b) of the heat shield (201),
    a first cross section (412) of the heat shield (201) between the first side skin (402) and the lower skin (400) includes a first triangular region (416) having a first vertex (418) on the first edge (406a), and
    a second cross section (414) of the heat shield (201) between the second side skin (404) and the lower skin (400) includes a second triangular region (420) having a second vertex (422) on the second edge (406b).
20. The method of embodiment 19, wherein the barriers (208) each comprise a close out frame (208b), the method further comprising attaching the close out frame (208b) to the lower skin (204) and the first side skin (402) or the second side skin (404), wherein:
  the close out frame supports the lower skin (400) and the first side skin (402) or the second side skin (404); and
  the close out frame (208b) ends before the first edge (406a) and/or the second edge (406b) so as to form a first opening (216a) in the interior (202) between the first edge (406a) and the barriers (208) and/or a second opening (216b) between the second edge (406b) and the barriers (208), thereby allowing flow (426) of the exhaust gas (424) in the first opening (216a) or the second opening (216b) along the length (252) of the heat shield (201); and
  providing a plurality of stiffeners (214), each of the stiffeners on an interior surface (218) of the first side skin (402) and/or the second side skin (404).

21. The design reduces thermal stresses while protecting the thermal insulation from heat and other environment risks and using a shape that suppresses the plume from curling up towards temperature sensitive regions of the aircraft structure.

22. A SPF (Super Plastic Formed) aft fairing segmented titanium heat shield assembly is that prevents buckling. The segmented overall structure emulates a closed torque box comprising of skins and frames subject to three sources of applied loading: external pressure field, thermal environment; and, noise environment. These load inputs from each source are reacted into the structure, resulting in the panels to react in-plane shearing, bending, and out-of-plane prying. In this By mitigating thermal stress/thermal buckling using the above described architecture reduce the risk of the usual problems witnessed on the strut aft fairing heat shield.

23. The method or structure (200) of any of the preceding embodiments, including the heat shield 201 comprising the skin 204 including a first side skin 402; a second side skin 404; and a lower skin 400; a first interface 450a between the lower skin 400 and the first side skin 402; and a second interface 450b between the lower skin 400 and the second side skin 404. The lower skin 400 includes pairs of segments 206 comprising a first segment 206a and a second segment 206a; and the first side skin 400 and the second side skin 402 each include the pairs of segments 206 comprising a third segment 206c and a fourth segment 206d. The first segment 206a comprises a first side portion 452 and a first edge portion 454, the second segment 206b comprises a second side portion 456 and a second edge portion 458, the third segment 206c comprises a third side portion 460 and a third edge portion 462, and the fourth segment 206d comprises a fourth side portion 464 and a fourth edge portion 466. The first interface 450a and the first interface 450b each comprise a first region 468 a second region 470. The first region 468 includes the first edge portion 454 joined to, and in physical contact or mechanical contact with, the third edge portion 462, and the second edge portion 458 joined to, and in physical contact or mechanical contact with, the fourth edge portion 466. The second region 472 of the interface is inwards of the first region 468 and includes the second side portion 456 and the fourth side portion 464 extending between the first side portion 452 and the third side portion 460.

24. A heat shield comprising:
  a first side skin;
  a second side skin;
  a lower skin;
  a first interface 450a between the lower skin and the first side skin;
  a second interface 450b between the lower skin and the second side skin, wherein:
    the lower skin includes pairs of segments 206 comprising a first segment 206a and a second segment 206a;
    the first side skin and the second side skin each include the pairs of segments 206 comprising a third segment 206c and a fourth segment 206d;
    the first segment comprises a first side portion 452 and a first edge portion 454, the second segment comprises a second side portion 456 and a second edge portion 458, the third segment comprises a third side portion 460 and a third edge portion 462, and the fourth segment comprises a fourth side portion 464 and a fourth edge portion 466;

the first interface 450*a* and the second interface 450*b* each comprise:
a first region 468 including:
the first edge portion joined to, and in physical contact or mechanical contact with, the third edge portion, and
the second edge portion joined to, and in physical contact or mechanical contact with, the fourth edge portion; and
a second region 472 of the interface inwards of the first region 468, wherein the second side portion and the fourth side portion extend between the first side portion 452 and the third side portion.

CONCLUSION

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A structure, comprising:
a heat shield including:
an interior;
a skin enclosing the interior;
a plurality of barriers attached in the interior to the skin, each of the barriers spaced to separate a plurality of thermal insulation layers disposed in the interior; and
wherein:
the barriers suppress heat flow between the thermal insulation layers;
the skin comprises a plurality of segments;
the heat shield comprises a plurality of joint regions, each of the joint regions:
between a pair of the segments comprising a first segment and a second segment; the first segment comprising a first end overlapping with a second end of the second segment; and
including a gap between the first end and the second end, the gap allowing thermal expansion and contraction of the segments and a flow of an exhaust gas into the interior, the flow of the exhaust gas generating the heat flow; and
the barriers comprise:
a first barrier attached to the first segment at a location having a spacing from the gap so that the flow of the exhaust gas through the gap outputs into the interior through the spacing and along a surface of the first barrier, and
a second barrier attached to the second segment.

2. The structure of claim 1, further comprising the thermal insulation layers resting on the segments on an underside of the heat shield.

3. The structure of claim 2, wherein one of the thermal insulation layers is between the first barrier and the second barrier, the one of the thermal insulation layers having an angled surface angling away from the spacing and the gap to allow the flow of the exhaust gas into the interior through the spacing.

4. The structure of claim 3, wherein:
the first barrier comprises a frame supporting the skin and a flange attached to the first segment, and
a third end of the flange is at the location having the spacing from the gap.

5. The structure of claim 1, wherein:
the skin comprises a lower skin connected to a first side skin and a second side skin, the lower skin meets the first side skin along a first edge of the heat shield, the lower skin meets the second side skin along a second edge of the heat shield, a first cross section of the heat shield, in a plane perpendicular to and passing through the first side skin and the lower skin, includes a first triangular region having a first vertex on the first edge, and
a second cross section of the heat shield, in a plane perpendicular to and passing through the second side skin and the lower skin, includes a second triangular region having a second vertex on the second edge.

6. The structure of claim 5, wherein the barriers each comprise a close out frame attached to the lower skin and the first side skin or the second side skin, the close out frame supporting the lower skin and the first side skin or the second side skin.

7. The structure of claim 6, further comprising a plurality of stiffeners, each of the stiffeners on an interior surface of the first side skin or the second side skin.

8. The structure of claim 6, wherein the close out frame ends before the first edge or the second edge so as to form a first opening in the interior between the first edge and the barriers, or a second opening between the second edge and the barriers, thereby allowing the flow of the exhaust gas in the first opening and the second opening along a length of the heat shield.

9. The structure of claim 8, wherein each of the barriers direct the flow of the exhaust gas along the surface of the each of the barriers towards the first opening or the second opening.

10. A jet engine comprising:
a nacelle,
an aerodynamic fairing including a forward strut fairing attached to the nacelle, an aft fairing, and an underwing fairing attached between the forward strut fairing and the aft fairing, the aft fairing further comprising the heat shield of claim 1.

11. The structure of claim 1, wherein the skin is formed using superplastic forming.

12. An aircraft including the structure of claim 1 and a jet engine, the aircraft propelled using the exhaust gas and the heat shield shielding the aircraft from the exhaust gas.

13. The structure of claim 1, further comprising:
the skin including a first side skin; a second side skin; and a lower skin;
a first interface between the lower skin and the first side skin;
a second interface between the lower skin and the second side skin, wherein:
the lower skin includes the segments comprising the first segment and the second segment;
the first side skin and the second side skin each include the segments comprising a third segment and a fourth segment;
the first segment comprises a first side portion and a first edge portion, the second segment comprises a second side portion and a second edge portion, the third segment comprises a third side portion and a third edge portion, and the fourth segment comprises a fourth side portion and a fourth edge portion, and the first interface and the second interface each comprise:

a first region including:

the first edge portion joined to, and in physical contact or mechanical contact with, the third edge portion, and the second edge portion joined to, and in physical contact or mechanical contact with, the fourth edge portion; and the second region inwards of the first region, wherein the second side portion and the fourth side portion extend between the first side portion and the third side portion.

14. A method of making a heat shield, comprising:

providing a skin including a plurality of segments and enclosing an interior of the heat shield; and attaching a plurality of barriers to the skin, each of the barriers spaced in the interior to separate a plurality of thermal insulation layers disposed in the interior; and wherein:

the barriers suppress heat flow between the thermal insulation layers;

the heat shield comprises a plurality of joint regions, each of the joint regions:

between a pair of the segments comprising a first segment and a second segment; the first segment comprising a first end overlapping with a second end of the second segment;

including a gap between the first end and the second end, the gap allowing thermal expansion and contraction of the segments and a flow of exhaust gas into the interior, the flow of exhaust gas generating the heat flow; and the barriers comprise a first barrier and a second barrier:

the first barrier attached to the first segment at a location having a spacing from the gap so that the flow of the exhaust gas through the gap outputs into the interior through the spacing and along a surface of the first barrier, and the second barrier attached to the second segment.

15. The method of claim 14, further comprising resting the thermal insulation layers on the skin on an underside of the heat shield.

16. The method of claim 14, wherein the first barrier comprises a frame supporting the skin and a flange, the method further comprising attaching the flange to the first segment so that a third end of the flange is at the location having the spacing from the gap.

17. The method of claim 16, wherein the skin comprises a lower skin connected to a first side skin and a second side skin, the method further comprising:

connecting the lower skin so that the lower skin:

meets the first side skin along a first edge of the heat shield, meets the second side skin along a second edge of the heat shield, a first cross section of the heat shield, in a plane perpendicular to and passing through the first side skin and the lower skin, includes a first triangular region having a first vertex on the first edge, and a second cross section of the heat shield, in a plane perpendicular to and passing through the second side skin and the lower skin, includes a second triangular region having a second vertex on the second edge.

18. The method of claim 17, wherein the barriers each comprise a close out frame, the method further comprising attaching the close out frame to the lower skin and the first side skin or the second side skin, wherein:

the close out frame supports the lower skin and the first side skin or the second side skin; and the close out frame ends before the first edge or the second edge so as to form a first opening in the interior between the first edge and the barriers, or a second opening between the second edge and the barriers, thereby allowing the flow of the exhaust gas in the first opening or the second opening along a length of the heat shield; and providing a plurality of stiffeners, each of the stiffeners on an interior surface of the first side skin or the second side skin.

* * * * *